United States Patent
Lichtenberg et al.

(10) Patent No.: US 7,677,080 B2
(45) Date of Patent: Mar. 16, 2010

(54) DUAL MODE CONTACT SENSOR FOR AUTOMOTIVE VEHICLE

(75) Inventors: Glen Lichtenberg, Ypsilanti, MI (US); Joseph Robert Brown, Grosse Ile, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 393 days.

(21) Appl. No.: 11/307,351

(22) Filed: Feb. 2, 2006

(65) Prior Publication Data

US 2007/0186633 A1  Aug. 16, 2007

(51) Int. Cl.
*G01P 15/00* (2006.01)
(52) U.S. Cl. .................................... 73/12.09
(58) Field of Classification Search ................ 73/12.01, 73/12.09
See application file for complete search history.

(56) References Cited

U.S. PATENT DOCUMENTS

| | | | |
|---|---|---|---|
| 632,991 A | | 9/1899 | Dupaw |
| 3,774,938 A | * | 11/1973 | Orlando ..................... 280/735 |
| 4,249,632 A | | 2/1981 | Lucchini et al. |
| 4,984,463 A | * | 1/1991 | Idogaki et al. ........... 73/514.08 |
| 5,435,409 A | | 7/1995 | Meyer et al. |
| 5,441,301 A | * | 8/1995 | Breed et al. ................. 280/735 |
| 5,756,948 A | | 5/1998 | Husby et al. |
| 5,793,005 A | | 8/1998 | Kato |
| 6,009,970 A | * | 1/2000 | Breed ......................... 180/274 |
| 6,169,479 B1 | | 1/2001 | Boran et al. |
| 6,212,456 B1 | | 4/2001 | Stride |
| 6,328,126 B2 | * | 12/2001 | Breed et al. ................. 180/274 |
| 6,329,910 B1 | | 12/2001 | Farrington |
| 6,557,889 B2 | * | 5/2003 | Breed ......................... 280/735 |
| 6,561,301 B1 | | 5/2003 | Hattori et al. |
| 6,744,354 B2 | | 6/2004 | Stephan et al. |
| 7,150,179 B2 | * | 12/2006 | Takafuji et al. ............. 73/12.09 |
| 7,188,894 B2 | * | 3/2007 | Humer et al. ........... 297/216.13 |
| 2004/0055805 A1 | | 3/2004 | Lich et al. |
| 2004/0108157 A1 | | 6/2004 | Takafuji et al. |
| 2004/0186643 A1 | | 9/2004 | Tanaka et al. |
| 2005/0092061 A1 | | 5/2005 | Takafuji et al. |

FOREIGN PATENT DOCUMENTS

| | | |
|---|---|---|
| EP | 0942853 A1 | 4/1999 |
| EP | 1133420 A1 | 6/2000 |
| EP | 1466790 A1 | 4/2004 |
| JP | 10038908 | 2/1998 |
| WO | 0123224 A1 | 4/2001 |
| WO | 2004089699 A1 | 10/2004 |

* cited by examiner

*Primary Examiner*—Lisa M Caputo
*Assistant Examiner*—Octavia Davis
(74) *Attorney, Agent, or Firm*—Jerome R. Drouillard; Frank MacKenzie

(57) ABSTRACT

A dual mode contact sensor for an automotive vehicle includes an impact-responsive tubular sensing member, and a first linear contact which is closed with the outer surface of the tubular sensing member. A second linear contact is mounted within the tubular sensing member such that a higher force impact, sufficient to cause plastic deformation of the tubular sensing member will cause a circuit to be closed with the second linear contact.

18 Claims, 4 Drawing Sheets

| Object Type | Force Level | Position | V1 | V2 | V3 | V4 |
|---|---|---|---|---|---|---|
| Pole | 500lb<F<8000lb | Center of Bumper | 3V | 0V | 3V | 0V |
| Pedestrian | 500lb<F<8000lb | Extreme Passenger Side | 5V | 0V | 1V | 0V |
| Barrier | 500lb<F<8000lb | Center of Bumper | 3V | 0V | 3V | 0V |
| Pole | F>8000lb | Extreme Driver Side | 1V | 1V | 5V | 5V |
| Rock | F>8000lb | Extreme Passenger Side | 5V | 5V | 1V | 1V |
| Barrier | F>8000lb | Center of Bumper | 3V | 3V | 3V | 3V |
| Pole | F>8000lb | 1/4 from Extreme Passenger Side | 4V | 4V | 2V | 2V |

DUAL MODE CONTACT SENSOR FOR AUTOMOTIVE VEHICLE

BACKGROUND OF THE INVENTION

The present invention relates to a impact or contact sensor which is capable of differentiating between lower force impacts, such as a contact event between a pedestrian and a vehicle, and more severe contact events, such as those experienced when a vehicle impacts upon a traffic barrier or another vehicle.

Automotive designers have used a variable plethora of sensors for the purpose of determining whether a vehicle has impacted with a pedestrian, or an inanimate object such as a pole, a barrier or another vehicle. The sensing of low-force impacts, such as that between a vehicle and a pedestrian, or a very low velocity impact of the vehicle against a rigid object is ideally performed with a reversible type of sensor. Reversibility allows the sensor to continue in service after a low force impact event. It is known to provide linear strip type sensors for this purpose, and U.S. Pat. No. 6,744,354 discloses such a sensor. Sensors useful for sensing pedestrian impacts are not however, generally optimized for sensing more severe impacts. Thus, designers have employed two types of sensors with some vehicles. The use of more than one type of sensor, of course, entails additional expense and complexity in the sensor control system.

A sensor and sensor system according to the present invention provides for low-force impact sensing applicable to pedestrian impacts, as well as to high-force impacts against larger and smaller inanimate objects such as poles, barriers, and other vehicles.

SUMMARY OF THE INVENTION

A dual mode contact sensor for an automotive vehicle includes an impact-responsive, tubular sensing member and a first linear contact which is closed with the tubular sensing member in the event that an impact displaces the tubular sensing member translationally by a predetermined distance in a predetermined direction. A second linear contact is closed with a tubular sensing member in the event that an impact deforms the tubular sensing member plastically to a predetermined extent. The present sensor has a first state in which neither the first, nor the second linear contact is closed with the impact-responsive sensing member, and a second state in which the impact-responsive sensing member is closed with only the first linear contact. In a third state, the tubular sensing member is closed with the first contact and with the second linear contact. The second sensor state is generally reversible, but the third state is not reversible.

According to another aspect of the present invention, the first and second linear contacts comprise strips of resistive material.

The first linear contact of the present sensor is supported by a carrier having a base which supports not only the first linear contact, but also a channel section for supporting the tubular sensing member in a spaced relationship with the first linear contact. The carrier will be deformed in the event that the tubular sensing member is deformed plastically, such that the tubular sensing member will be retained in contact with not only the first linear contact, but also the second linear contact, following an impact event having sufficient severity to plastically deform the tubular sensing member. To this end, the second linear contact is mounted within the tubular sensing member upon an insulator. The tubular sensing member is generally cylindrical, and the second linear contact is mounted diametrically upon an insulator within the tubular sensing member.

In general, the magnitude of impact required to close the tubular sensing member with the second linear contact is greater than the magnitude of impact required to close the tubular sensing member with the first linear contact.

According to another aspect of the present invention, a contact sensor system for an automotive vehicle includes a plurality of dual mode contact sensors adapted for mounting upon a common surface of the vehicle. A controller provides power for each of the dual mode contact sensors and receives signals from each of the sensors. The dual mode contact sensors are configured for installation upon a vehicle such that the outputs of the sensors are proportional to the location of an impact along the length of the first and second linear contacts.

According to another aspect of the present invention, the system controller may calculate the velocity of an impact based on the timing of signals from the linear contacts.

According to another aspect of the present invention, a method for determining the velocity of an impact with an automotive vehicle includes the steps of providing a dual mode contact sensor having an impact-responsive, tubular sensing member mounted within a carrier and providing a first linear contact which is closed with the tubular sensing member following impact-driven translational movement of the tubular sensing member within the carrier, and providing a second linear contact which is closed with the tubular sensing member following impact-driven plastic deformation of the tubular sensing member following contact with the first linear contact.

Finally, the present method includes measuring the elapsed time between closure of the tubular sensing member with the first linear contact and closure with the second linear contact, followed by a determination of the velocity of the impact as a function of at least the elapsed time. As described above, the first linear contact and the second linear contact each include a resistive strip, which combine with the tubular sensing member to constitute a variable resistor.

It is an advantage of a sensor system according to the present invention that a single sensor will provide sensing of not only lesser impacts, such as the impact between a vehicle and a pedestrian, but also sensing of higher energy impacts such as those experienced between a vehicle and another vehicle, or a vehicle and a stationary object.

It is a further advantage of a system according to the present invention that the location of an impact and the severity of the impact may be determined with a single sensor.

It is a further advantage of a system and method according to the present invention that the velocity of an impact may be determined with a sensor which also determines the severity of the impact, and as well as an estimation of the mass and size of the object being impacted.

Other advantages, as well as features and objects of the present invention, will become apparent to the reader of this specification.

DETAILED DESCRIPTION OF THE PREFERRED EMBODIMENTS

Figure 1:
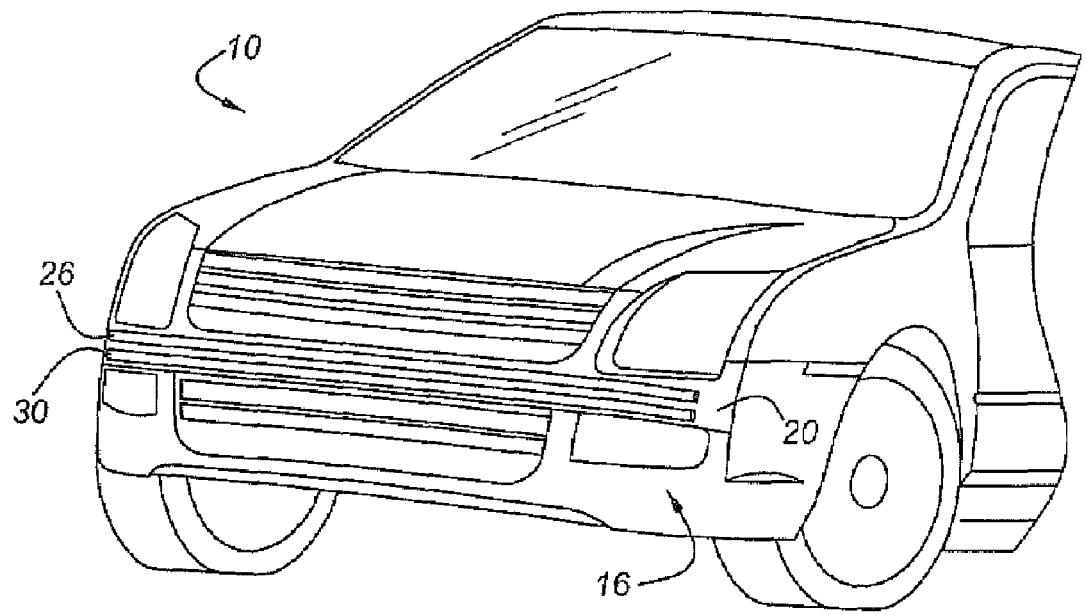
FIG. 1 is a perspective view of a portion of a vehicle having a dual mode contact sensor system according to the present invention installed in the vehicle's front bumper.

As shown in FIG. 1, vehicle 10 has a front bumper, 16, with a bumper cover, 20. Bumper cover 20 serves as a mounting for upper contact sensor 26 and lower contact sensor 30. Although sensors 26 and 30 are depicted as being surface-mounted to bumper cover 20, those skilled in the art will appreciate in view of this disclosure that upper contact sensor 26 and lower contact sensor 30 could be incorporated within bumper 16 at a location behind bumper cover 20.

Figure 2C:
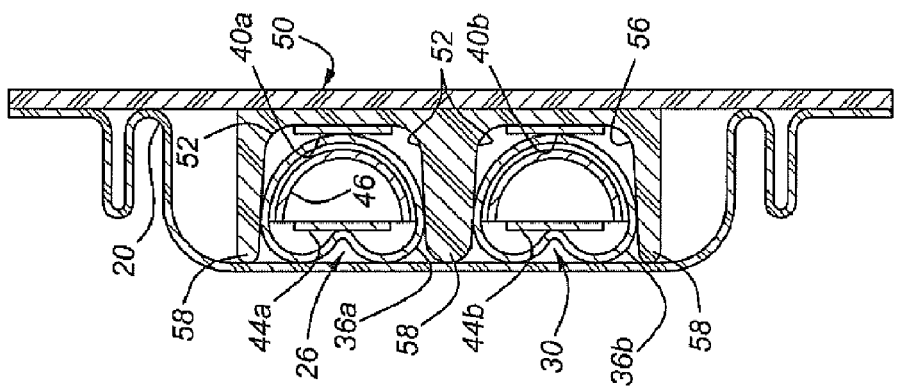
FIG. 2 is a multipart sectional view of a dual mode contact sensor according to the present invention.
Figure 2B:
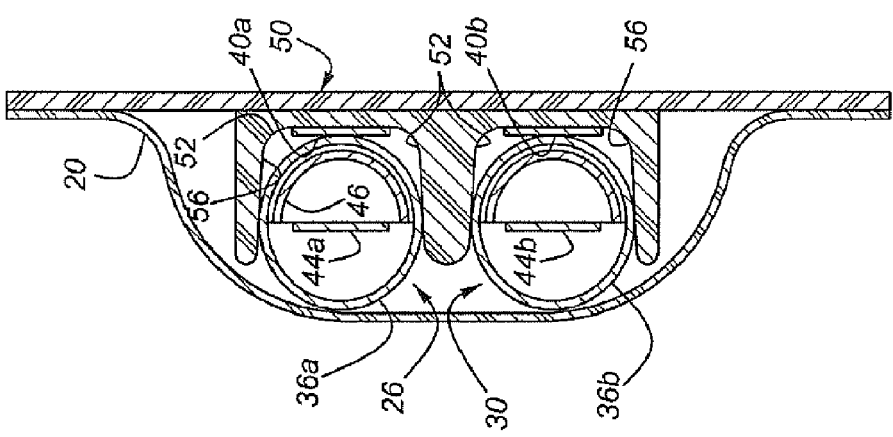
Figure 2A:
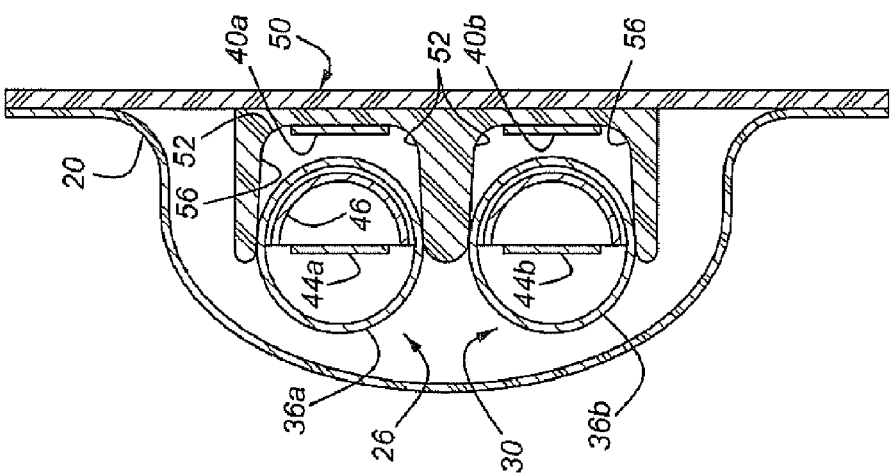

FIG. 2 illustrates the construction and positioning of upper contact sensor 26 and lower contact sensor 30. Each of these contact sensors includes an impact-responsive tubular sensing member, in this case metallic tube 36a in of case of upper contact sensor 26, and 36b in the case of lower contact sensor 30. Tubes 36 may be constructed of not only metal, but alternatively, of plastics, composites, or other type of electrically conductive materials known to those skilled in the art and suggested by this disclosure. Tubes 36 are mounted to vehicle 10 by means of carrier 50, which has two channels, 56, formed therein so as to robustly support tubes 36a and 36b. First linear resistive contacts 40a and 40b are mounted to base 52 of carrier 50.

Channels 56 allow tubes 36 to be displaced translationally in the event of an impact against bumper cover 20. An impact sufficient to push either or both of tubes 36 rearwardly against the physical resistance offered by channels 56 will ultimately cause the displaced tube 36 to close with its mating first linear contact 40a or 40b, as the case may be. This position is shown in FIG. 2B. When either of tubular sensing members 36 touches their respective linear contact 40a or 40b, a variable resistance circuit is completed, as will be discussed more fully below. In the event that the force of an impact is sufficient only to displace either or both of tubular sensing members 36 translationally, but insufficient to plastically, or permanently, deform either of tubes 36, the sensing event is said to be reversible. If however, the impact causes plastic deformation of tubes 36, the sensing event is said to be non-reversible.

Each of tubular sensing members 36 has an additional linear contact, 44, mounted within the tubular sensing member. Linear contacts 44a and 44b are closed with tubular sensing members 36a and 36b only in an event that an impact against the sensor assembly has sufficient severity to deform members 36 plastically to a predetermined extent, which is shown in FIG. 2C. This response is in contrast with the situation depicted in FIG. 2B, which illustrates the position of tubular sensing members 36 in the event of a lesser impact, such as would be experienced between a vehicle and a pedestrian. Accordingly, although tubes 36a and 36b are shown in FIG. 2B as contacting first linear contacts 40a and 40b, respectively, both tubes maintain their original configuration. On the other hand, in FIG. 2C, contact is made between plastically deformed tubes 36a and 36b and all of their respective contacts 40a, 40b, and 44a and 44b. When tubes 36 deform plastically to a degree sufficient to create the conditions shown in FIG. 2C, tips 58 of carrier 50 are also deformed to a point at which tubes 36 are maintained in contact with second linear contacts 44a and 44b. The material bending stiffness of tubes 36 and the stiffness of material chosen for carrier 50, as well as the size and wall thickness of tubes 36 determine the operational characteristics of the present sensor system.

Figure 3:
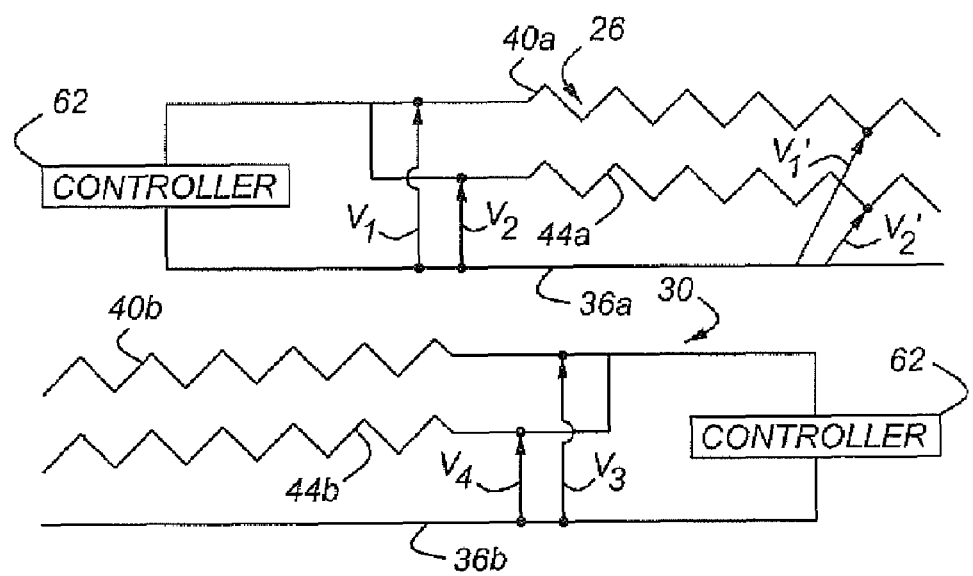
FIG. 3 is a circuit schematic of a sensor system according to the present invention.

FIG. 3 is a schematic representation of a sensor system according to the present invention showing controller 62, which is connected with upper contact sensor 26 and lower contact sensor 30. Controller 62 imposes a voltage on first linear contacts 40 and second linear contracts 44. Depending upon the location of the impact, the resistance provided by first linear contacts 40a and 40b and second linear contacts 44a and 44b will be different, with the result that voltages V1 and V2, V3 and V4, which are the output voltages from sensors 26 and 30 will be different. The upper portion of FIG. 3 shows that voltages V1 and V2 are transformed to V1' and V2', respectively. A similar transformation occurs with voltages V3 and V4.

Figure 4:
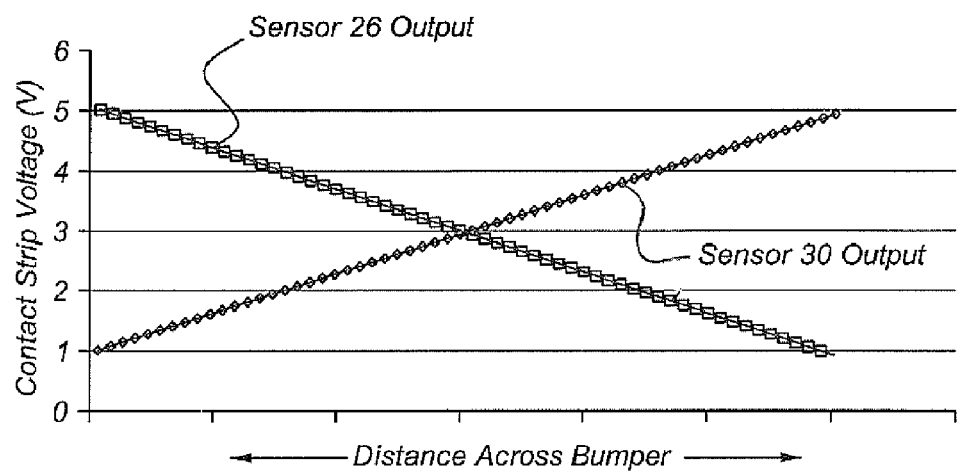
FIG. 4 shows the output of a sensor system according to the present invention.

The voltage outputs from sensors 26 and 30 are shown in FIG. 4, as contact strip voltage, which varies as a function of distance across bumper 16. Notice from FIGS. 3 and 4 that the sensor circuits are oriented such that the maximum and minimum voltages from each circuit are achieved at opposite ends of bumper 16. In this manner, the dimensions of a striking object may be determined by analysis of the resulting signals. This may be accomplished either through the use of a lookup table within controller 62, or by means of an analytical subroutine within controller 62. These details are committed to those wishing to practice the present invention.

Figure 5:
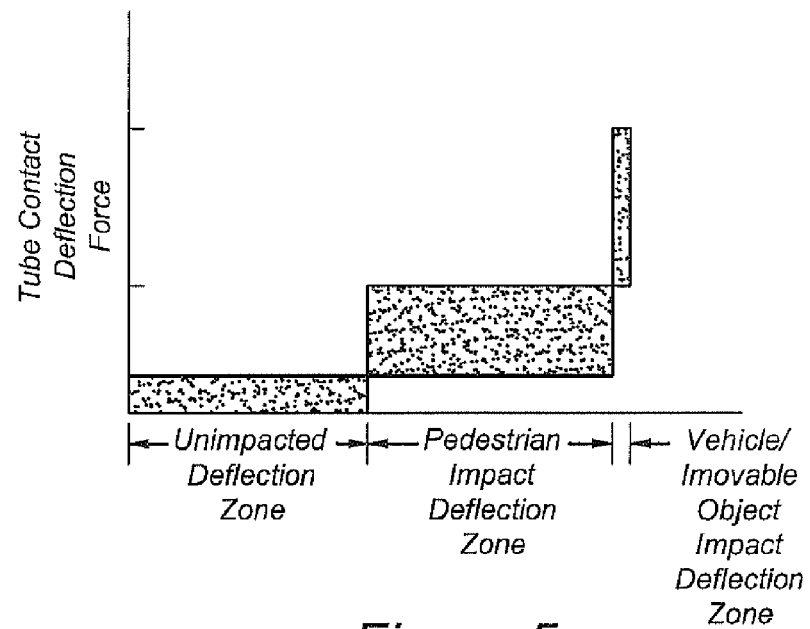
FIG. 5 illustrates a relationship between displacement of the present sensor and the force of impact.

FIG. 5 illustrates a step transfer function for sensor displacement and impact force for the three operational zones. This shows a linearized sensor tube contact force/displacement relationship in which an inflection point occurs between the responses to lower and higher levels of impact force, such that much greater impact forces are required to achieve progressively further displacement of tubular sensing members 36 once deflection force corresponding to the pedestrian impact zone has been exceeded. Calibration of the present sensor to achieve the characteristics shown in FIG. 5 may be accomplished in a logical fashion by appropriate selection of the material and wall thickness of carrier 50, as well as the material and wall thickness of tubular sensing members 36.

Figures 6, 7:
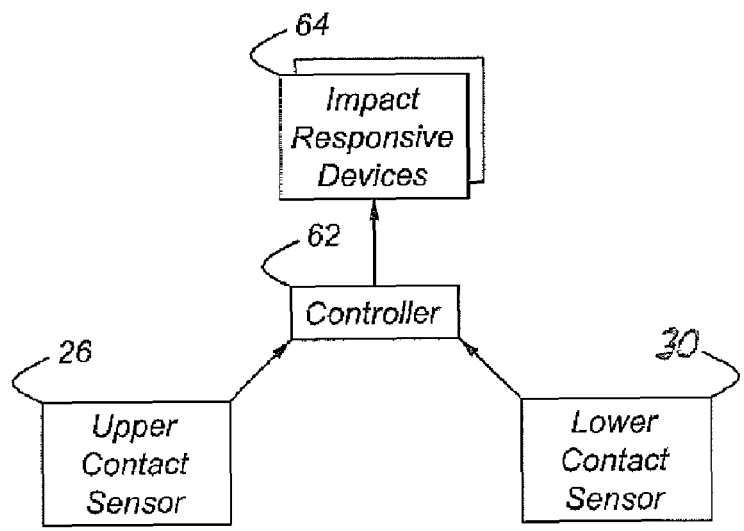
FIG. 6 is a chart illustrating output voltages for the present sensor system.
FIG. 7 is a block diagram illustrating a sensor system according to the present invention.

FIG. 6 is a table illustrating idealized output voltages V1, V2, V3, and V4, as a function of the type of striking object, the force level and the position along bumper 16 at which an impact occurs. Thus, for example for a barrier impact with an impact force from 500 to 8,000 pounds, and for a position centered on bumper 16, V1, which corresponds to the V1 of FIG. 3, will be about 3 volts and V2 and V4 will be 0. V3 will also be at 3 volts. If, the impact force generated by the pole is greater than 8,000 pounds and on the extreme driver's side of bumper 16, voltages V1 and V2 will be at 1 volt and voltages V3 and V4 will be at 5 volts, which is the maximum system output voltage. Controller 62 may use a lookup table having entries similar to those of FIG. 6 to determine the location and magnitude of an impact against bumper 16.

The present system, which is shown in a block diagram form in FIG. 7, may be used to determine not only the location and severity of an impact, but also the velocity of impact. This may be accomplished by measuring the time between the successive states illustrated at FIGS. 2B and 2C. This is a calibratable event because the time required for the present sensor system to respond to an impact is a function of the relative stiffness of the materials used for carrier 50, and the stiffness of tubes 36a and 36b. Controller 62 is operatively connected with upper contact sensor 26 and lower contact sensor 30, and measures the elapsed time between the states 2B and 2C and either performs a calculation to determine impact speed, or uses a look-up table. Either method may include as input variables to the velocity determination not only measured time, but other operating parameters known to those skilled in the art and suggested by this disclosure. Depending upon the speed and severity of the impact, controller 62 may deploy impact responsive devices 64, which may include, without limitation, such countermeasures as airbags, side curtain airbags, or external safety devices.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A dual mode contact sensor for an automotive vehicle, comprising:
   an impact-responsive, tubular sensing member;
   a first linear contact, which is closed with said tubular sensing member in the event that an impact displaces the tubular sensing member translationally and elastically by a predetermined distance in a predetermined direction; and
   a second linear contact, which is closed with said tubular sensing member in the event that an impact deforms the tubular sensing member plastically to a predetermined extent.

2. A dual mode contact sensor according to claim 1, wherein said sensor has a first state in which neither of said first and second linear contacts is closed with said impact-responsive sensing member, a second state in which said impact-responsive sensing member is closed with only said first linear contact, and a third state in which said sensing member is closed with said first contact and said second linear contacts.

3. A dual mode contact sensor according to claim 2, wherein said second state is reversible.

4. A dual mode contact sensor according to claim 2, wherein said third state is non-reversible.

5. A dual mode contact sensor according to claim 2, wherein said second state is reversible and said third state is non-reversible.

6. A dual mode contact sensor according to claim 1, wherein said first linear contact and said second linear contact comprise resistive material.

7. A dual mode contact sensor according to claim 1, further comprising a carrier having a base for supporting said first linear contact and a channel section for supporting said tubular sensing member in a spaced relationship with said first linear contact.

8. A dual mode contact sensor according to claim 7, wherein said carrier is plastically deformed in the event that the tubular sensing member is deformed plastically, such that the tubular sensing member will be retained in contact with said second linear contact following an impact event having sufficient severity to plastically deform said tubular sensing member.

9. A dual mode contact sensor according to claim 1, wherein said second linear contact is mounted within said tubular sensing member upon an insulator.

10. A dual mode contact sensor according to claim 9, wherein said tubular sensing member is generally cylindrical and said second linear contact is mounted diametrically within said tubular sensing member.

11. A dual mode contact sensor according to claim 1, wherein the magnitude of impact required to close said tubular sensing member with said second linear contact is greater than the magnitude of impact required to close the tubular sensing member with said first linear contact.

12. A contact sensor system for an automotive vehicle, comprising:
   a plurality of dual mode contact sensors adapted for mounting upon a common surface of a vehicle, with each of said sensors comprising:
   an impact-responsive, tubular sensing member;
   a first linear resistive contact, which is closed with said tubular sensing member in the event that an impact displaces the tubular sensing member translationally and elastically by a predetermined distance in a predetermined direction; and
   a second linear resistive contact, which is closed with said tubular sensing member following contact with said first linear contact, in the further event that an impact deforms the tubular sensing member plastically to a predetermined extent; and
   a controller for providing power to said plurality of dual mode contact sensors and for receiving signals from each of said linear contacts.

13. A contact sensor system according to claim 12, wherein said dual mode contact sensors are configured for installation upon a vehicle such that the outputs of said sensors are proportional to the location of an impact along the length of said linear contacts.

14. A contact sensor system according to claim 12, wherein said controller calculates the velocity of an impact based on the timing of signals from said linear contacts.

15. A contact sensor system according to claim 12, wherein each of said dual mode contact sensors is mounted upon the surface of a bumper cover attached to said vehicle.

16. A contact sensor system according to claim 12, wherein each of said dual mode contact sensors is mounted within a bumper attached to said vehicle.

17. A method for determining the velocity of an impact with an automotive vehicle, comprising the steps of:
   providing a dual mode contact sensor having an impact-responsive, tubular sensing member mounted within a carrier;
   providing a first linear contact with is closed with the tubular sensing member following impact-driven translational and elastic movement of the tubular sensing member within the carrier;
   providing a second linear contact which is closed with the tubular sensing member following impact-driven plastic deformation of the tubular sensing member following contact with the first linear contact;
   measuring the elapsed time between closure of the tubular sensing member with said first linear contact and said second linear contact; and
   determining the velocity of an impact as a function of at least said elapsed time.

18. A method according to claim 17, wherein said first linear contact and said second linear contact each comprise a resistive strip.

* * * * *